(12) United States Patent
Brug et al.

(10) Patent No.: US 8,950,625 B2
(45) Date of Patent: Feb. 10, 2015

(54) ARTICLE DISPENSING

(75) Inventors: Mark Brug, Lackawanna, NY (US); Brian D. Kamas, Cheektowaga, NY (US); Jason Kerkeslager, Amherst, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 58 days.

(21) Appl. No.: 13/483,787

(22) Filed: May 30, 2012

(65) Prior Publication Data

US 2013/0320033 A1   Dec. 5, 2013

(51) Int. Cl.
 *B65H 3/00* (2006.01)
 *B65G 47/74* (2006.01)
 *B65B 5/00* (2006.01)

(52) U.S. Cl.
 CPC   *B65H 3/00* (2013.01); *B65G 47/74* (2013.01); *B65B 5/00* (2013.01)
 USPC .................. 221/231; 221/277; 221/265

(58) Field of Classification Search
 CPC ................... B65B 61/22; B65D 83/0409
 USPC ................... 221/263, 277, 231, 234, 265
 See application file for complete search history.

(56) References Cited

U.S. PATENT DOCUMENTS

| 4,398,550 | A | * | 8/1983 | Shireman ........................ 453/32 |
| 4,997,405 | A | * | 3/1991 | Dabrowski ..................... 221/237 |
| 5,219,095 | A | * | 6/1993 | Shimizu et al. ................ 221/264 |
| 6,390,736 | B2 | * | 5/2002 | Rassman et al. ............... 406/180 |
| 7,392,111 | B2 | * | 6/2008 | Shendege ....................... 221/263 |
| 7,896,195 | B2 | * | 3/2011 | Limback et al. ............... 221/265 |

* cited by examiner

*Primary Examiner* — Timothy Waggoner
(74) *Attorney, Agent, or Firm* — Lee & Hayes, PLLC

(57) ABSTRACT

An apparatus for dispensing sorbent canisters into containers includes a first wheel and a second wheel, disposed to rotate with each other. A first plate is disposed between the first and second wheels and a second plate is disposed on a side of the second wheel opposite the first wheel.

12 Claims, 9 Drawing Sheets

ARTICLE DISPENSING

BACKGROUND OF THE INVENTION

1. Technical Field

This invention relates to material handling and packaging. More specifically, the invention relates to a system and method for accurately and quickly inserting articles, such as desiccant canisters, into containers.

2. Description of Related Art

Sorbents have been used conventionally in packaging of products to extend the life of those products. In one application, a sorbent is provided in a canister, such as a polymer-based canister, and that canister is placed in a larger container designed to hold some product. This application is particularly well known in the pharmaceutical and nutraceutical arts, in which the sorbent canister is placed in a bottle or vial along with dry pharmaceuticals, such as pills, to absorb any moisture in the bottle.

Conventionally, the canisters have been placed in the containers before or after they are filled with the pharmaceutical and either manually or by automated processes. However, the demand for pharmaceuticals has increased immensely. While automated processes to dispense pharmaceuticals have been re-worked to quicken the dispensing of the pharmaceutical into the container, the time it takes to place the canister in the container is too slow. In fact, the act of placing the sorbent canister in the container is one of the slowest processes, and thus slows the entire pharmaceutical packaging system.

Thus, there is a need in the art for an improved system that quickly and reliably dispenses sorbent canisters into containers, such as bottles.

SUMMARY OF THE INVENTION

The present disclosure addresses the foregoing needs in the art by providing systems and methods for dispensing sorbent canisters into containers.

In one aspect, an apparatus according to the disclosure includes first and second rotatable members disposed to rotate about an axis. A first, fixed plate is disposed between the first and second rotatable members and a second, fixed plate is disposed on a side of the second rotatable member opposite the first rotatable member. The second plate is displaced rotationally about the axis relative to the first plate such that a terminal ledge of the first plate overlaps the second plate. Receptacles are provided through the first and second rotatable members to receive canisters therein and through which canisters may pass. In operation, a canister enters one of the first rotatable member receptacles and contacts and is supported on a top surface of the first plate, disposed thereunder. As the member rotates, the canister moves on the first plate until it reaches the first ledge. Once the receptacle clears the first ledge, the canister exits the receptacle in the first rotatable member and enters a second receptacle in the second rotatable member. There the canister contacts and is supported by the second plate. Continued rotation of the second rotatable member moves the canister on the second plate to the second ledge, and continued rotation past the ledge causes the canister to leave the receptacle of the second rotatable member at a filling position.

In another aspect, a container is provided at the filling position to receive the canister leaving the second rotatable member.

These and other aspects, features, and benefits of the invention will be appreciated further with reference to the following detailed description of the invention and accompanying figures, in which preferred embodiments are described and illustrated.

BRIEF DESCRIPTION OF THE DRAWING FIGURES

DETAILED DESCRIPTION OF THE INVENTION

This disclosure relates generally to dispensing articles in a controlled and consistent manner. An exemplary embodiment will be described hereinafter in which the article is a substantially-cylindrical canister containing a sorbent. The invention is not limited to dispensing sorbent canisters. Those having ordinary skill in the art will understand that the inventive concepts of this disclosure may be applied across a number of industries, to dispense any number of differently sized and constituted articles.

Figure 1:
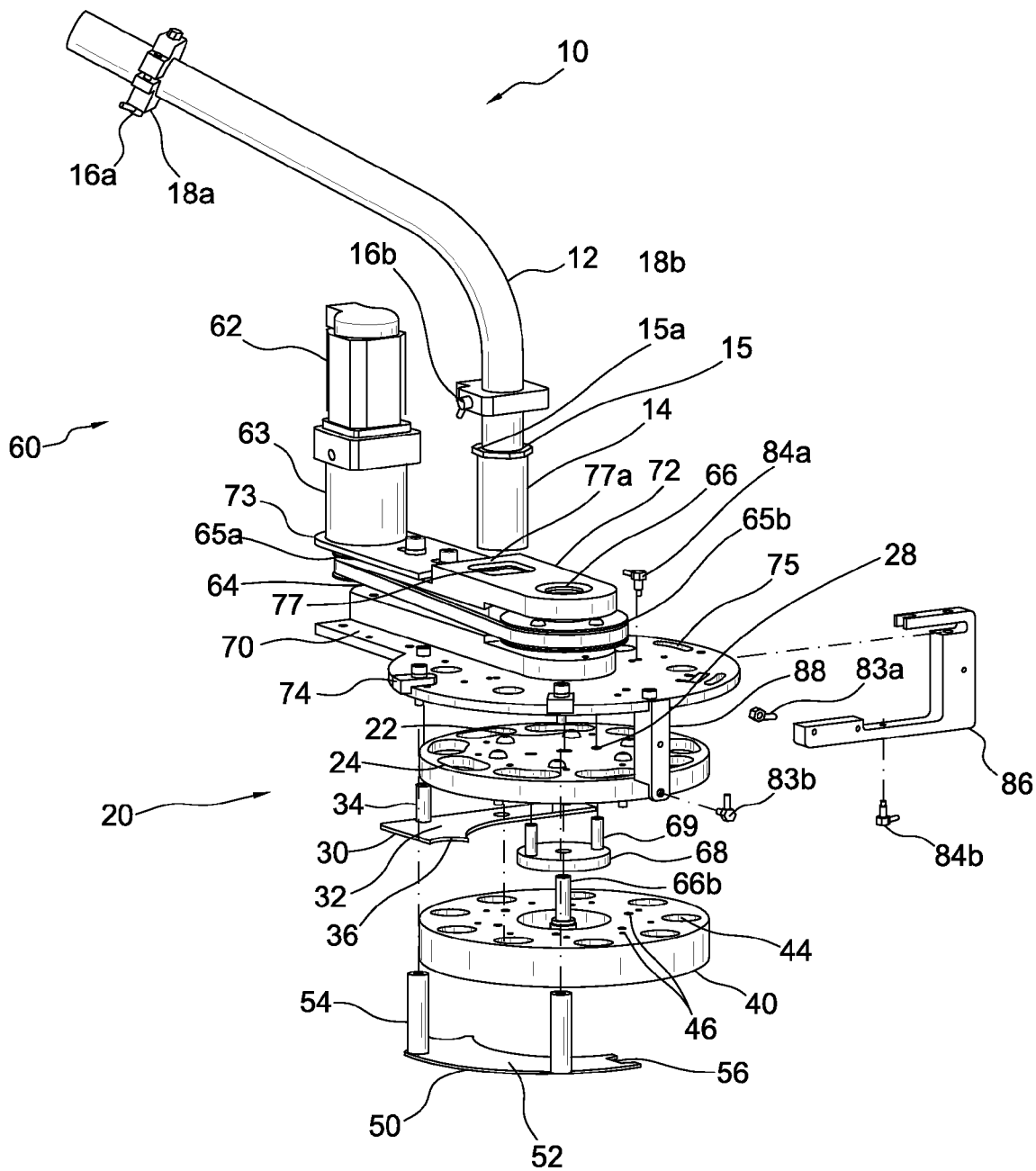
FIG. 1 is an exploded perspective view of an article dispenser according to one embodiment.

FIG. 1 is an exploded view of a dispensing system 2 according to an embodiment of the disclosure. As illustrated, the system 2 generally includes a canister supply 10, a first rotatable member 20, a second rotatable member 40, a first slide plate 30, a second slide plate 50, and a drive system 60. These and other features of the disclosure will be described in detail with reference to the Figure.

The system 2 may be generally characterized as selectively and in a controlled manner dispensing articles entering the system via the canister supply 10 into a container or other item arranged proximate an outlet of the system. As illustrated, the canister supply 10 includes a conduit 12 terminating at an adapter 14 that connects the conduit to the remainder of the system 2. The conduit 12 preferably receives canisters from some source, such as a hopper or the like and is sized to provide the canisters one after another in a queue to the system. In one embodiment, the conduit is a tube, such as a polymer tube having an inner diameter larger than an outer diameter of the canister, through which the canisters to be dispensed will pass freely. In the illustrated embodiment the canisters pass through the conduit under the influence of gravity. In other embodiments, gravity may be replaced by, or supplemented with, some external force, such as pressurized air in the conduit.

As noted above, the adapter 14 is generally provided to connect the conduit to the remainder of the system. In some embodiments the adapter 14 could be a clamp or other device that holds the terminal end of the conduit 12. In the illustrated embodiment, the adapter 14 is a sleeve surrounding the terminal end of the conduit 12 and having a flange 15 with one or more flat surfaces 15a. The one or more flat surfaces 15a preferably are formed to cooperate with one or more flat surfaces 77a provided on an aperture 77 formed in a mounting plate 70, which will be described in more detail below. The flat surfaces 15a, 77a cooperate as keyed surfaces to prevent rotation of the conduit. Those having ordinary skill in the art will understand that the flat surfaces also may be used to promote a preferred rotational alignment of the conduit 12 relative to the mounting plate 70 (and thus relative to the remainder of the system). In other embodiments, the sleeve may have no flat surfaces, such that the input tube 12 may be oriented at any angle.

In alternative arrangements, the adapter 14 may not include the flange 15, in which case, as required, the sleeve may have one or more flat surfaces. In the illustrated embodiment, the adapter 14 is selectively removable from the aperture 77 to allow for access to the terminal end of the conduit 12, for example for cleaning or change-over to a new supply from a different conduit. In one embodiment, the adapter 14 has sufficient weight that it will remain in the aperture 77 during operation without external manipulation. In other embodiments, for example, such as if compressed air is used which may be sufficient to separate the conduit 12 from the mounting plate 70 absent something retaining the adapter 14 in place, some known external manipulator may be included, such as a set screw, transverse pin, or a detent. In still other embodiments, the adapter could be threaded into the retaining aperture.

Sensors 16a, 16b are illustrated as mounted to the conduit 14 via sensor mounts 18a, 18b. The sensors 16a, 16b detect whether a canister is present in the conduit. In the illustrated embodiment, each sensor includes a beam emitter and a facing beam receiver. Such sensors are conventionally known and operate to determine whether a canister is present or absent. Specifically, the sensor senses presence of a canister when the beam receiver does not receive the beam, i.e., because the part blocks the emitted beam, and the sensor senses absence of a canister when the receiver receives the beam, i.e., because nothing is blocking the emitted beam. Other sensors are also known in the art that will detect presence or absence of a canister; the disclosure is not limited to the illustration. When the conduit is clear, as is contemplated in one embodiment, the sensors 16 can detect the canisters through the conduit 14. In other embodiments, a viewing port or hole may be provided through the conduit to allow for determination of canister presence/absence.

In the illustrated embodiment, two sensors 16a, 16b are provided. In a presently contemplated method using the system 2, first sensor 16a acts to maintain a sufficient queue of canisters, whereas second sensor 16b confirms that a critical, minimum number of canisters is present in the system. More specifically, when the first sensor 16a detects absence of a canister it will signal to an upstream canister dispenser (not shown) that more canisters are needed in the conduit. Absence of a canister at the second sensor 16b preferably triggers a shut down of the system 2, because no canisters (or more likely only a very small number of canisters) are available for dispensing. This is particularly useful to ensure that canisters are dispensed in every container, or because presence of containers is confirmed elsewhere, e.g., upstream of the conduit.

In the illustrated embodiment, both the first and second sensors 16a, 16b are movable along the conduit, via the clamps 18a, 18b, to allow a user to customize the system. Although two sensors 16a, 16b are shown, more or fewer sensors also may be used. In other embodiments, no sensor will be provided on the conduit, for example, because a separate determination is made to confirm that each container does include a canister.

The conduit 12 need not be a tube. Any known mechanism or system that provides the canisters to be dispensed one after another will suffice. The conduit 12 formed as a flexible tube generally allows for spacing the source from the remainder of the system, but the source could be disposed proximate the system.

The first rotatable member is a wheel 20 disposed to rotate about an axis 22. A plurality of first wheel canister receptacles 24 is provided, each being a hole through the first wheel 20. The illustrated first wheel 20 also includes one or more viewing apertures 26 and alignment holes 28. The viewing apertures 26 and alignment holes 28 will be described below in more detail.

The receptacles 24 are equally spaced about the axis. In the embodiment illustrated in FIG. 1, nine receptacles are shown, with forty-degrees between adjacent receptacles. The invention is not limited to nine receptacles; more or fewer could be provided. Moreover, the receptacles need not be equally spaced. Each of the receptacles preferably is a predetermined radial distance from the axis and is sized to allow a properly oriented canister to pass therethrough. That is, the outer diameter of a canister to be dispensed is smaller than the inner diameter of each of the receptacles 24. In other embodiments, the canister may be other than cylindrical. For these arrangements, the receptacle could be shaped differently, to accommodate the differently shaped canister.

The first wheel 20 is disposed such that when rotated, the receptacles 24 come into cooperative alignment with the outlet of the conduit. Accordingly, canisters leaving the outlet of the canister supply 10 are received, one at a time, in the receptacles 24. As the first wheel rotates, each of the receptacles 24 passes under the outlet to receive one of the canisters. Precautions preferably are taken to ensure that more than one canister cannot be received in the receptacle 24 at a time. To this end, the thickness of the first wheel preferably is less than the height or length of the canister.

As noted above, each receptacle 24 preferably is a through hole through which each canister may pass. A first plate 30 is provided under the first wheel 20, however, to selectively prevent the canister from falling out the bottom of the first wheel, via the receptacle 24. The first plate 30 preferably is characterized by a substantially smooth and planar top surface 32. The first plate 30 is disposed under the first wheel 20, opposite the outlet of the conduit 12. Thus, when a canister enters a receptacle at the outlet, it does not slide through the first wheel, but instead comes to rest on the top surface 32 of the first plate 30, thereby being retained in the receptacle 24.

The first plate 30 extends in a manner generally corresponding to a portion of the path of rotation of the receptacles and terminates at a ledge 36, which is generally an edge of the first plate 20. In operation, as the wheel continues to move relative to the plate, the plate extends to continue to be located under the canister such that the canister continues to slide along the top surface 32 of the first plate 30 until the canister reaches the ledge 36. Upon passing the ledge 36, the canister passes through the receptacle 24, i.e., because there is no longer a plate to slide on. While this drop through the receptacle 24 may be solely gravity-fed, an assisting force may also be provided, e.g., by introducing pressurized air above receptacle 24.

As the canister leaves the bottom of the first plate, it preferably falls into one of a plurality of second canister receptacles 44 formed through the second rotatable member, which is a second wheel 40 in the illustrated embodiment. Like the first canister receptacles 24, the second canister receptacles 44 have an inner diameter that is larger than the outer diameter of the canister. The second canister receptacles preferably also are sized to receive only a single canister at a time and correspond in number with the first canister receptacles. In the illustrated embodiment, the first and second wheels 20, 40 are aligned such that the first and second canister receptacles 24, 44 are axially aligned. Thus, when a canister exits the first canister receptacle, the canister enters directly the second canister receptacle, through the top of the second wheel. To facilitate a smooth transition from a first canister receptacle to a second canister receptacle, the second canister receptacles may have a slightly larger diameter than the first canister receptacles. Alternatively, or in addition, the distance between the first wheel 20 and the second wheel 40 is less than the height of the canister. The canister is less likely to become jammed when one or more of these precautions are taken.

The second wheel preferably also includes at least one viewing aperture 46, axially aligned with the viewing aperture 26 of the first wheel 20.

The second plate 50 is disposed below the second wheel 40. Like the first plate 30, the second plate 50 has a substantially smooth, planar top surface 52. The second plate 50 is arranged such that a portion of the top surface 52 is opposite (relative to the second wheel 40) the first ledge 36 and the second ledge extends a predetermined distance therefrom in the direction of rotation of the second wheel 50, terminating at a second ledge 56. Accordingly, a canister that enters into one of the second canister receptacles 44 after clearing the first ledge 36 sits on the top surface 52 while disposed in the receptacle 44. Because the first and second wheels 20, 40 rotate relative to the first and second plates 30, 50, the canister in the second container receptacle will remain there until it clears the second ledge 56, at which time the canister will exit the second wheel, e.g., under the influence of gravity. Pressurized air or some other outside force may be used in addition to gravity to aid in the canister's movement.

A container is provided at a filling position, proximate and below the second ledge 56, to receive a canister as it falls from one of the second canister receptacles 44. The container may be placed in the filling position in any conventional manner. In one embodiment, a conveyor, such as a belt or feed screw, provides a plurality of containers one after another at the filling position. The containers could alternatively be placed manually at the filling position.

As described above, a canister is provided from a canister supply to a filling position. A preferred process includes providing the containers, seriatim, to the first wheel as the wheel rotates at a constant velocity, for one-by-one reception in first canister receptacles formed as holes through the first wheel. Once received in a first canister receptacle, the canister rides along a top surface of a first plate provided below the first wheel. Continued rotation of the first wheel moves the retained canister along the first plate until it reaches a first ledge, which is a termination of the first plate. Under the force of gravity and/or an external force, such as a jet of air, the canister falls out of the first canister receptacle and into a second canister receptacle formed through a co-axial second wheel. The canister remains in the second canister receptacles, because a second plate is disposed under the second wheel at the position at which the canister drops into the second wheel. The second plate is similar to the first plate in that it has a smooth top surface and continued rotation of the second wheel causes the canister to move along the second plate. The second plate terminates at a second ledge, and as the second canister receptacle containing the canister clears the second ledge, the canister drops, under the force of gravity, out of the second wheel.

The first and second wheels 20, 40 are driven to rotate about an axis. FIG. 1 shows one example of a drive system 60 that will rotate the wheels 20, 40 in the manner described above. The drive system generally includes a servo motor 62 communicating with a driving pulley 65a. A belt 64 is driven by the driving pulley 65a to turn a driven pulley 65b arranged coaxially with the first wheel 20 and the second wheel 40. More specifically, the driven pulley 65b drives a first wheel shaft 66a that is keyed or otherwise joined to one or both of the first and second wheels. In the illustrated embodiment, a screw, such as a thumb screw 66b also is provided, to thread into the first wheel shaft 66a and retain the first and second wheels 20, 40 together. The first and second wheels 20, 40, and first wheel shaft 66a and the screw 66b preferably cooperate such that the first and second wheels rotate together about their co-axial axes. Other members also may be provided to maintain registration of the first and second wheels 20, 40. For example, the first wheel is provided with alignment holes 28 that receive pins 69 extending from a key plate 68. The key plate 68 preferably is fixed to the second wheel 40. The pins 69 also preferably extend into through the first wheel 20 and into a hub on the shaft 66. In one embodiment, the key plate 68 may be threaded onto the screw 66b. Screws or the like may also be provided to fix the first wheel 20 relative to the second wheel 40.

The illustrated drive system 60 may include additional components. For example, a gear box 63 also is illustrated, between the motor 62 and the driving pulley 65a, to regulate the pulley. Instead of a belt and pulleys, other mechanical transfer mechanisms, such as a chain drive, may be used to drive the first and second wheels 20, 40. As is conventional, the servo motor has an output shaft rotating about a driving axis. In still other embodiments, the driving axis of the servo motor may be coaxial with the first and second wheel axes 22, 42, in which case no belt and pulley or equivalent system would be necessary.

Proper orientation of the components of the system preferably is provided by appropriate mountings and spacers. As illustrated in FIG. 1, a mounting plate 70 is provided upon which a support arm 72 is disposed. The support arm 72 is configured to mount the pulleys 65a, 65b, the first wheel shaft 66a, and the servo motor 62. A motor mount plate 73 also may be provided between the servo motor 62 and the mounting plate 70. A plurality of apertures also is formed though the mounting plate 70. The apertures include arcuate slots 75 and sensor mounting apertures 76, which will be described in more detail below. The canister supply aperture 77 also is formed through the support arm 72. Although not shown the supply aperture 77 extends through the mounting plate, too. The canister supply aperture 77 may have a varied cross-section. For instance, as described above, a portion of the aperture 77 may be keyed to hold the adapter 14 in one position. Moreover, a bottom of the aperture 77 may be smaller than the top. For example, the portion of the aperture 77 that receives the adapter may be a bore, such that the size of the aperture 77 at the bottom, i.e., at the mounting plate 70 is sized only to allow a canister to pass therethrough. In the preferred embodiment, the aperture 77 is formed by a first hole through the mounting arm and a second, coaxial hole through the mounting plate. Thus, the adapter will rest on the top of the mounting plate 70 when inserted into the aperture 77, but canisters will pass through the mounting plate. The first canister receptacles 24 of the first wheel 20 are selectively alignable with the aperture 77, such that the bottom-most canister in the aperture will fall into an aligned empty first receptacle.

First plate spacers 34 are attached to the first plate 30 and the mounting plate 70 to fix the position of the first plate in the vertical direction. Second plate spacers 54 are similarly provided to fix the second plate 50 relative to the mounting plate

70. As illustrated, the top of each of the second plate spacers 54 is attached to a slide clamp 74. The slide clamps 74 are disposed in the arcuate slots 75. The slide clamps 74 are movable in the arcuate slots to adjust the position of the second plate 50. This arrangement allows for adjustability, especially of the second ledge 56, for example, to ensure that canisters drop at the appropriate position. Although not illustrated, the first plate could also be mounted with clamps and slots, although the position of the first plate is generally less critical.

The system 2 also includes controls to ensure proper operation of the system. For example, a first sensor pair 83a, 83b is provided proximate the filling position to confirm that a canister has dropped from the second wheel 40. A second sensor pair 84a, 84b is provided for alignment purposes. Specifically, these sensors are aligned vertically to pass a beam through the viewing apertures 26, 46 in the first and second wheels 20, 40. As the wheels turn, the sensors will detect each time an aperture passes. Brackets 86, 88 also are provided, as necessary, to mount the sensors.

The sensor pairs 83a, 83b, 84a, 84b preferably cooperate with the canister supply sensors 16 to ensure proper functioning of the system. As described above, the canister supply sensors ensure that a queue of canisters is available for dispensing. In a preferred embodiment, the first and second wheels rotate at a constant speed to provide uninterrupted dispensing. In another embodiment, the first sensor pair 83a, 83b will preferably repeatedly sense canister dispensing at a predictable rate consistent with the speed of the wheels. The second sensor pair 84a, 84b preferably is used only for alignment purposes at setup, i.e., to "zero" or home the system with a proper dispense position. As a backup to correlating sensed canisters with timing of the wheels, the first sensor pair 83a, 83b and the second sensor pair 84a, 84b may also cooperate. More specifically, the viewing apertures 26, 46 in each wheel correspond in number and position to each dispense position. Accordingly, every dispense position should correspond with a determined, sensed dropped canister. TAbsent both happening, the system may be stopped automatically. In other embodiments, the wheels will continue to rotate even if no drop was sensed and either the container with no canister therein will be removed from the line or the container will wait until a canister is dispensed. he controls may or may not use each viewing aperture to determine the drop. Controls (not shown) may also be provided to confirm that a container is present at the filling position.

As noted above, the system is preferably allowed to operate with the wheels continuously rotating. The inventors have found that the rate of dispense is limited only by the speed at which the containers can be presented at the filling position. Containers are generally presented linearly under the wheels 20, 40 and are moving in a direction that is substantially the same as the tangential movement of the receptacle 46 at the dispense position. Because of its continuous operation, the system has been found to dispense canisters at speeds previously unattained by conventional machines. Specifically, the inventors have achieved repeated and accurate dispensing at speeds exceeding 300 parts/minute.

The apparatus described above is also highly customizable for dispensing of differently sized canisters. In particular, the first and second wheels may be changed out for wheels with larger or smaller and/or differently shaped receptacles. Shorter or longer spaces for the plates also may be provided, if the wheels are required to have different thicknesses. Moreover, and as described above, the plates may be adjustable via the arcuate slots 75.

Although the invention has been described with particular reference to the FIG. 1, other modifications also are contemplated. For example, although the illustrated embodiment contemplates making the first and second wheels 20, 40 as separate components because of the ease of manufacturing and construction. However, those having ordinary skill in the art will also understand that the first and second wheel may be formed as a single wheel having a circumferential cutout providing clearance for the first plate. Other modifications also will be understood by those having ordinary skill in the art, once educated by this disclosure.

The apparatus just described may be modified in many ways. For example, it may be desirable to drop more than one canister into each container. To accommodate this requirement, the wheels 20, 40 and thus the wheel receptacles 26, 46 are sized such that the desired number of articles fills the vertical space. The multiple articles will then be moved through the wheels, together, in the same manner just described for a single article. Alternatively, if multiple canisters are desired in a single container and the receptacle 26, 46, are sized only to retain a single article, the container may dwell at the dispense position until the desired number of articles have been dispensed into the container.

As noted above, the article supply providing articles to the conduit may take any form. FIGS. 2-7 show a feeder bowl assembly 100, which may be such a supply. The feeder bowl assembly 100 acts like a hopper to receive a relatively large quantity of sorbent canisters and orient the canisters for transport via the conduit. Thus, the feeder bowl assembly 100 is connected to an inlet of the conduit 12. Although the feeder bowl assembly 100 will be described herein as being related to the canister dispenser described above, it is not limited to this use. The feeder bowl assembly 100 may be used in any number of articles in which it is desirable to orient and provide like articles at an outlet of the feeder bowl assembly 100.

Figure 2:
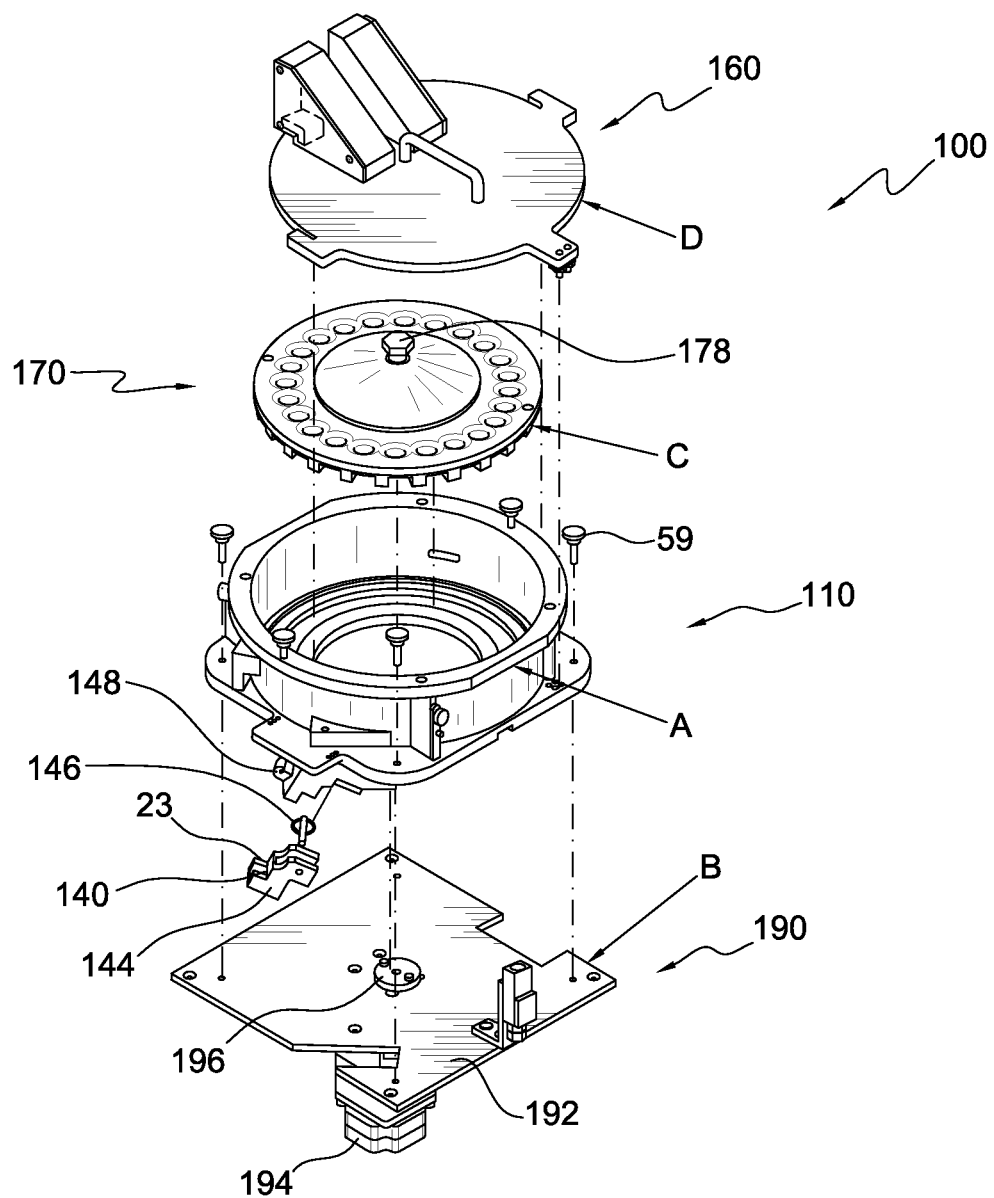
FIG. 2 is an exploded perspective view of a feeder bowl assembly according to another embodiment of the invention.

As shown in the FIG. 2, the feeder bowl assembly 100 generally includes a feeder bowl 110, a lid 160, a filter 170, and a base 190. Those components will be discussed below in more detail.

Figure 3:
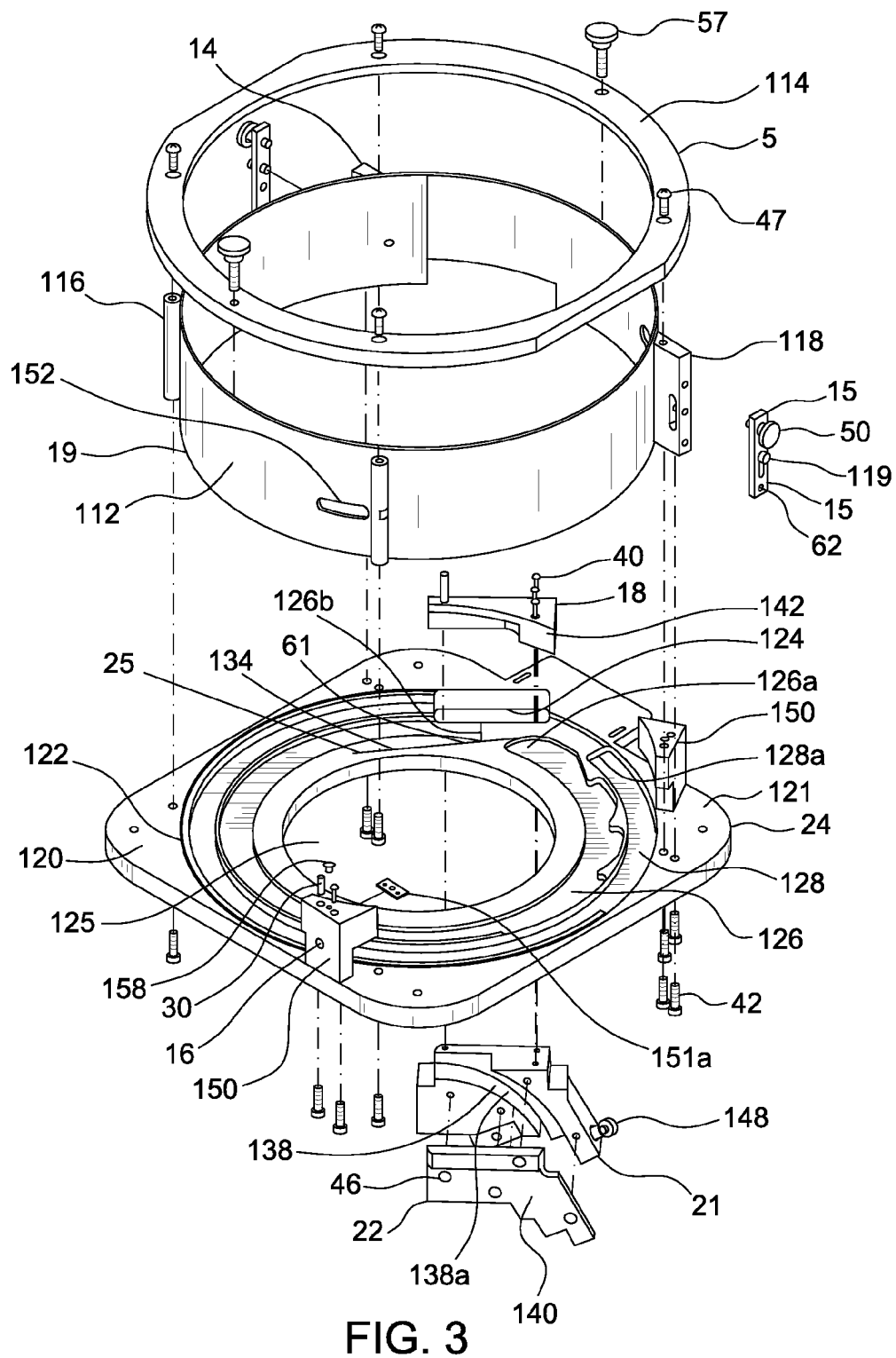
FIG. 3 is an exploded perspective view of a portion of the feeder bowl assembly of FIG. 2.

FIG. 3 is an exploded view of the feeder bowl 110. The feeder bowl 110 generally includes a cylindrical sidewall 112, a rim 114 and a base 120. The rim 114 preferably is fixed to a top of the cylindrical sidewall 112 using rim support posts 116, 118. The rim support posts 116, 118 preferably are fixed to the outside of the sidewall and certain of the rim support posts 118 are adapted to mount sensors 119, the function of which will be described in more detail below.

The sidewall 112 is preferably made of a material such as sheet metal, and is formed into the cylindrical shape. The rim may be any suitable material, including but not limited to polymeric materials and metals. The rim support posts 116, 118 may be fixed to the sidewall 112 using any conventional means, including but not limited to fasteners and welding.

Figure 4:
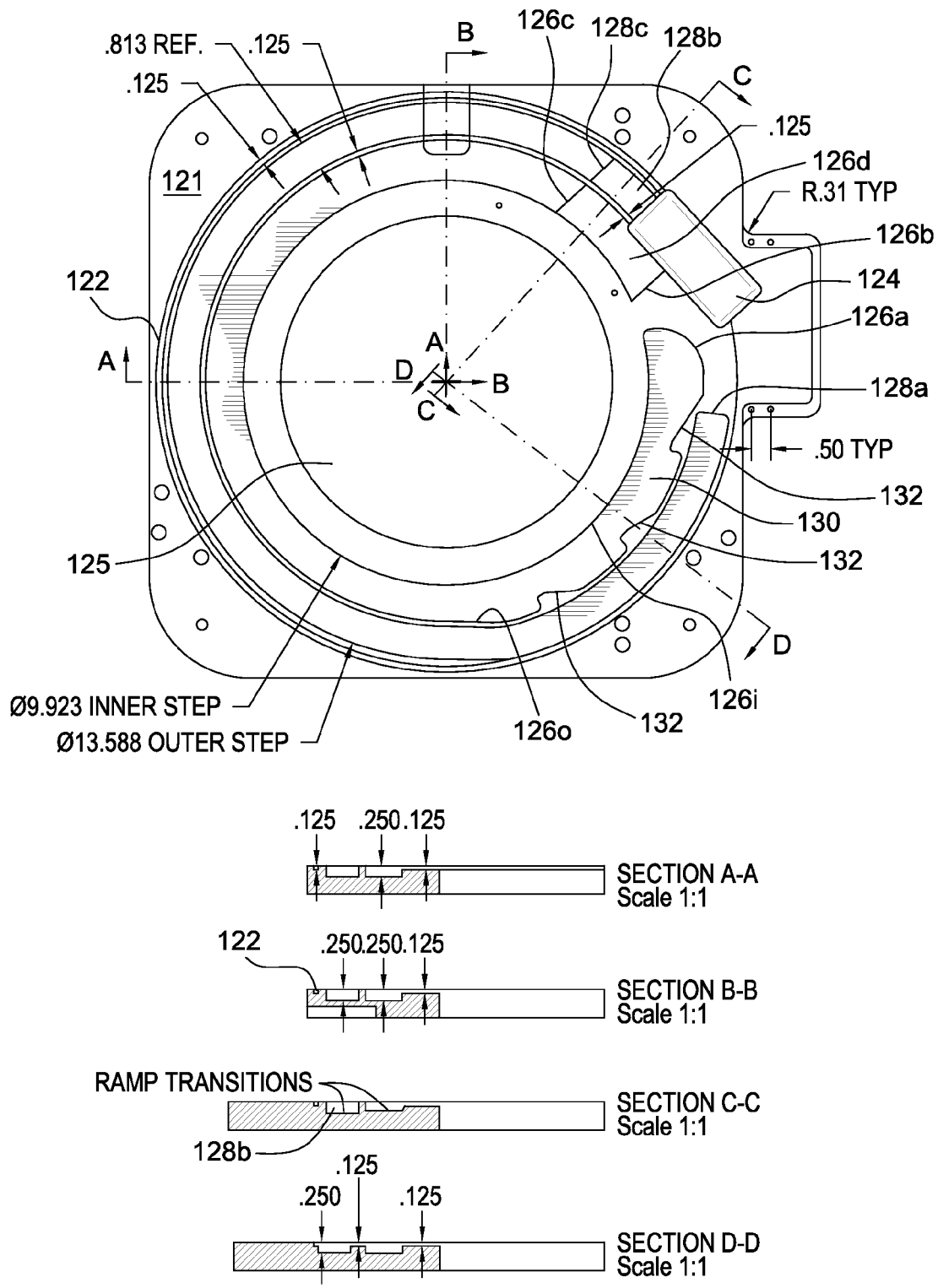
FIG. 4 is a plan view and cross-sectional views of a portion of the feeder bowl assembly of FIG. 2.

The base 120 of the feeder bowl assembly is illustrated in FIGS. 3 and 4. The base 120 is sufficiently rigid to support the sidewall 112 and rim 114. In the illustrated embodiment, the base 120 has a groove 122 formed in its top surface 121 approximating the shape of the lower edge of the sidewall 112. When assembled, the sidewall 112 is contained in the groove 122 and fasteners are used to fix the sidewall relative to the base 120. In the illustrations, screws are passed through the base 120 from below the base 120 to thread into the rim support posts 116, 118. As illustrated, the groove 112 need not contain the entire circumference of the sidewall 112. For example, there is no groove proximate an outlet cutout 124. And, for about 90-degrees clockwise from the outlet cutout 124, the groove 122 only includes the outer edge, and thus is really only a lip or wall, instead of a groove. Other variations on the groove 122 will be appreciated by those having ordinary skill in the art. Moreover, the groove 122 may not be necessary at all in some embodiments.

The base 120 also includes a central cutout 125, and substantially concentric inner and outer tracks 126, 128. The tracks 126, 128 have a width that is slightly larger than the outside diameter of a canister to be handled by the feeder bowl assembly 100, such that canisters will be contained in each track but can slide freely along the tracks 126, 128. The outer track 128 has an outer track origin 128a and proceeds generally clockwise to the outlet cutout 124. The outer track 128 is arranged just inside the groove 122 and is formed as relatively constant depth relative to a top of the base 120. However, the depth of the outer track 128 increases at a ramp transition position 128c to form a ramp 128b terminating at the outlet cutout 124.

The inner track 126 is disposed radially inside the outer track 128. It commences at an outer track origin 126a, and terminates at an inner track termination 126b. Like the outer track 128, the inner track 126 has a substantially constant depth, except that at a ramp transition position 126c, the depth decreases to form a ramp 126d that ascends to the ramp termination 126b, which is at the top surface 121 of the base 120.

The inner and outer tracks 126, 128 may have the same depth, diverging only at the ramps 126d, 128b, or the depths could be different along the length of the tracks. In some embodiments, the inner and outer tracks 126, 128 may have the same width, i.e., to retain the outer diameter of the canister to be conveyed, while allowing the canister to slide in the track. In the illustrated embodiment, the widths of the tracks 126, 128 are substantially the same except for at a lead in portion 130 of the inner track 126. The lead in portion 130 has a wider width than the remainder of the track 126, but has a series of ramped protrusions 132 along an outer edge 126o of the track 126. The protrusions act as cam surfaces to guide canisters in the track toward an inner edge 126i of the track 126. Although three protrusions are shown, more or fewer may be provided.

A diverter 134 is situated proximate the inner track termination 126b. In the illustrated embodiment, the diverter is a length of spring steel anchored proximate the inner edge 126i of the inner track 126 and angled across the inner track termination 126b. In operation, canisters in the bowl are captured in the inner track 126 and proceed to move clockwise therein. As the canisters approach the inner track termination 126b, they contact the diverter 134, which forces the canisters radially outwardly. The diverter 134 guides the canisters past the inner track origin 126a and the outlet cutout 124 and into the outer track 128. Canisters continue travel contained in the outer track 128 until they reach the outlet cutout 124, where they exit the feeder bowl.

Through the outlet cutout 124 the canisters preferably proceed to the conduit for conveyance to a downstream apparatus, such as the filling system described above. In the illustrated embodiment, an outlet guide 136 is provided. The guide 136 has a curved channel 138 through which the canisters will pass to the conduit. A guide cover 140 also is provided over the curved channel 138 to maintain canisters in the guide 136. The guide cover 140 preferably is selectively removable, to allow access to the channel 138. The guide 136 preferably is fixed to the base 120 proximate the outlet cutout 124 using conventional fasteners. A guide top 142 also is illustrated, to be fixed to the top of the guide 136. In the illustrated embodiment, the guide 136 is generally disposed below the base 120, whereas the guide top 142 extends above the base 120.

The canisters preferably are substantially cylindrical, and proceed around the tracks on end, i.e., with their axis in a substantially vertical orientation. As they proceed into the outlet cutout 124 via the curved channel 138, they began to cant, with their bottom maintaining contact with a bottom 138a of the curved channel 138. At the end of the channel, the canisters have rotated nearly 90-degrees, such that their axis is nearly horizontal, at which point they align with an opening through which the canister leaves the feeder bowl assembly. As illustrated in FIG. 2, the opening is a hole 140 formed in a conduit adapter 144 that is selectively fixed to the outlet guide 136. The conduit adapter 144 preferably receives the conduit (not shown) therein. The conduit adapter 144 may be attached to the outlet guide 136 using any known fastening scheme, although a pin 146, such as a quick-release detent pin, is shown in FIG. 2.

Canisters proceeding through the hole 140 in the conduit adapter and into the conduit may be gravity fed or can be aided by an external force. In the illustrated embodiment, an air port 148 is provided through the outlet guide 136 to pass air through the end of the channel 138 and into the opening. Constant air flow may be provided through the air port 148 or discrete bursts of air may be provided. As will be understood, air through the air port 148 will contact the top of the canister to accelerate the canister through the hole 140, and into the conduit.

The conduit adapter 144 is illustrated as being removable from the outlet guide 136, but the two could be a unitary piece. Moreover, the channel 138 may rotate the canister more or less than is illustrated, without departing from the spirit and scope of the invention.

Also illustrated in FIG. 3 is a pair of agitator posts 150, which have protruding agitators 151a, 151b that extend into the bowl through bowl cutouts 152. The agitators 151a, 151b are positioned such that canisters spinning in the bowl and tending to stay against the sidewall will contact the agitators 151a, 151b and be knocked away from the sidewall 112.

As noted above, sensors 119 preferably are mounted outside the sidewall 112 on the rim mounts 118. A pair of sensors 119, e.g., an emitter and a receiver, passes a beam between each other through sensor holes in the sidewall. When the beam passes successfully between the sensors 119, the height of the canisters is deemed too low so canisters are added to the bowl. When the bean is interrupted, i.e., is not received by the receiver, filling of the bowl is stopped, as a sufficient number of canisters is deemed to be in the bowl.

Figure 5:
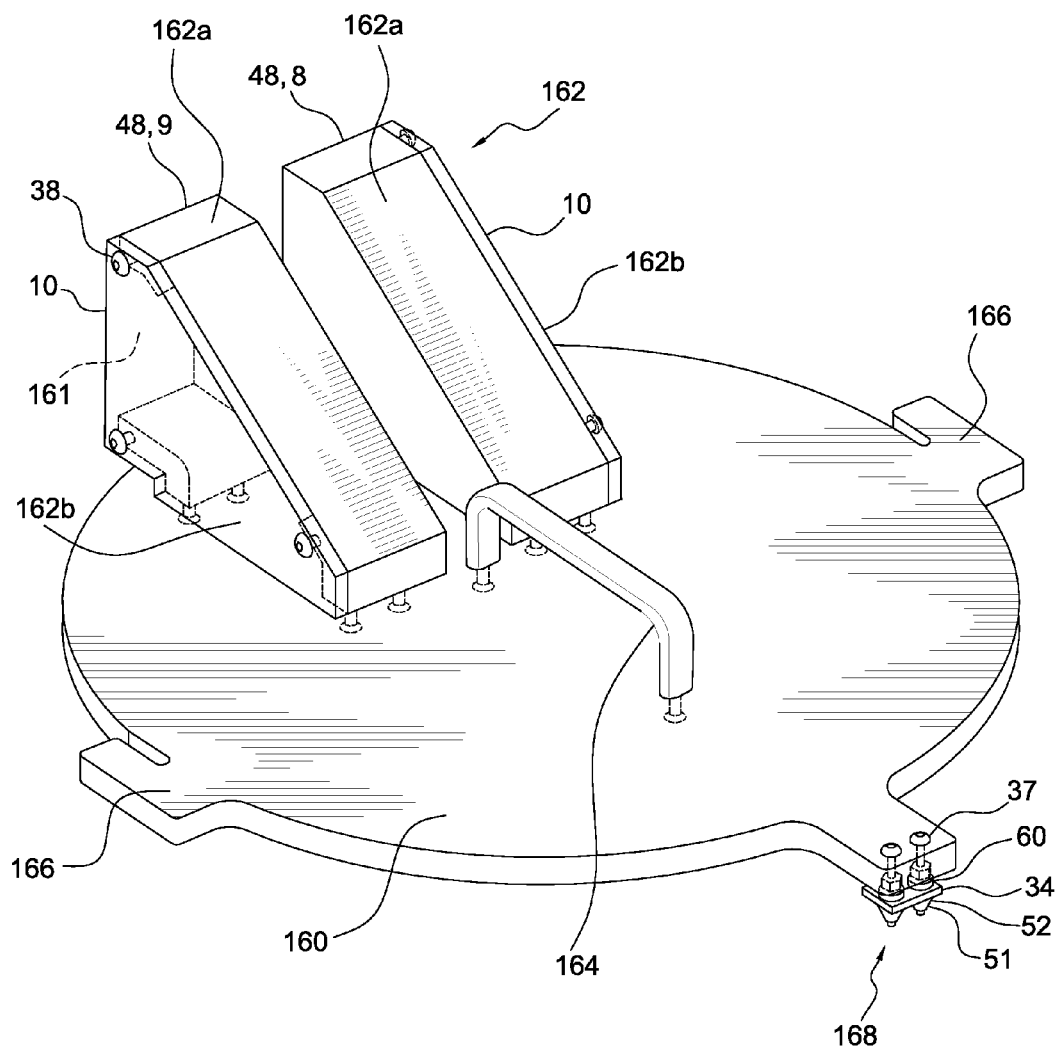
FIG. 5 is a perspective view of a portion of the feeder bowl assembly of FIG. 2.

Filling the bowl may be accomplished through the bowl's open top, but, as shown in FIG. 5, preferably is accomplished through inlets 162 mounted on the lid 160. The inlets are preferably fixed over openings formed in the lid 160 and have a vertical opening 161 through which canisters are inserted into the bowl. An angled top extends from the top of the vertical opening to the radially inner-most portion of the opening in the lid 160, although this shape is not necessary. Moreover, although the inlets 162 are shown as being two-pieced, with a main body 162a and attachable cover 162b, they could be a single piece. The illustrated construction is merely for ease of manufacture. Flaps (not shown) or the like may be provided over the vertical openings 161.

The lid 160 is retained on the rim 114 of the bowl 110 to cover the open top of the bowl. Any known mechanism(s) may be used to retain and remove the lid 160. In the illustrated embodiment, the lid 160 also includes a handle 164. Moreover, notched tabs 166 are provided on edges of the lid 160.

Thumb screws or similar fasteners in the bowl are aligned in the notches and will bear on the top surface of the lid to retain the lid in place, but those screws need not be completely removed from the rim to allow for sliding removal of the lid from the bowl. A conventional keyed safety switch 168 also is provided, to ensure that the lid 160 is not unsafely removed, e.g., while the bowl is in operation. The lid may be made from any conventional materials, and in some embodiments is preferably clear such that a user can visually inspect an amount of canisters therein.

Figure 6A:
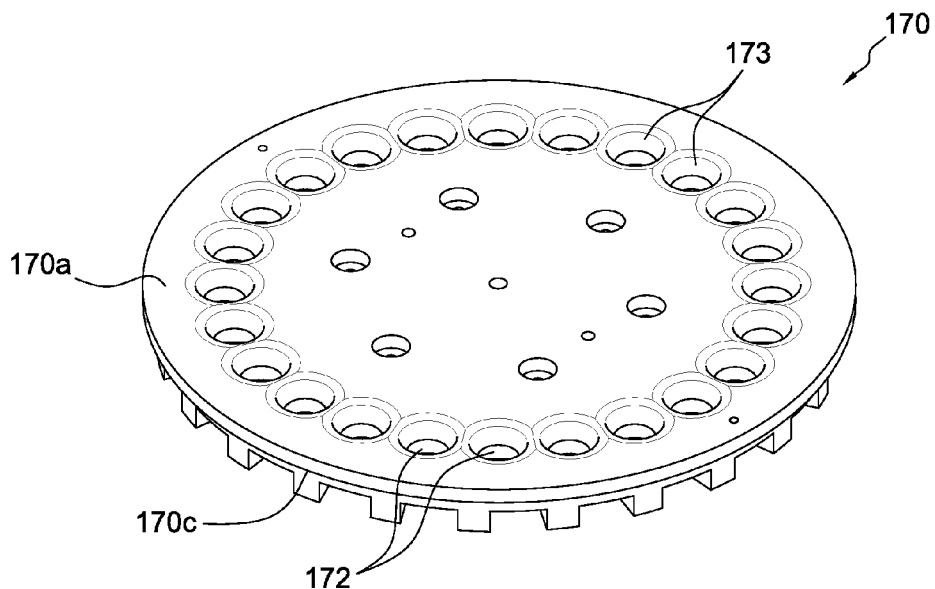
FIGS. 6A-6E are various views of another portion of the feeder bowl assembly of FIG. 2.
Figure 6B:
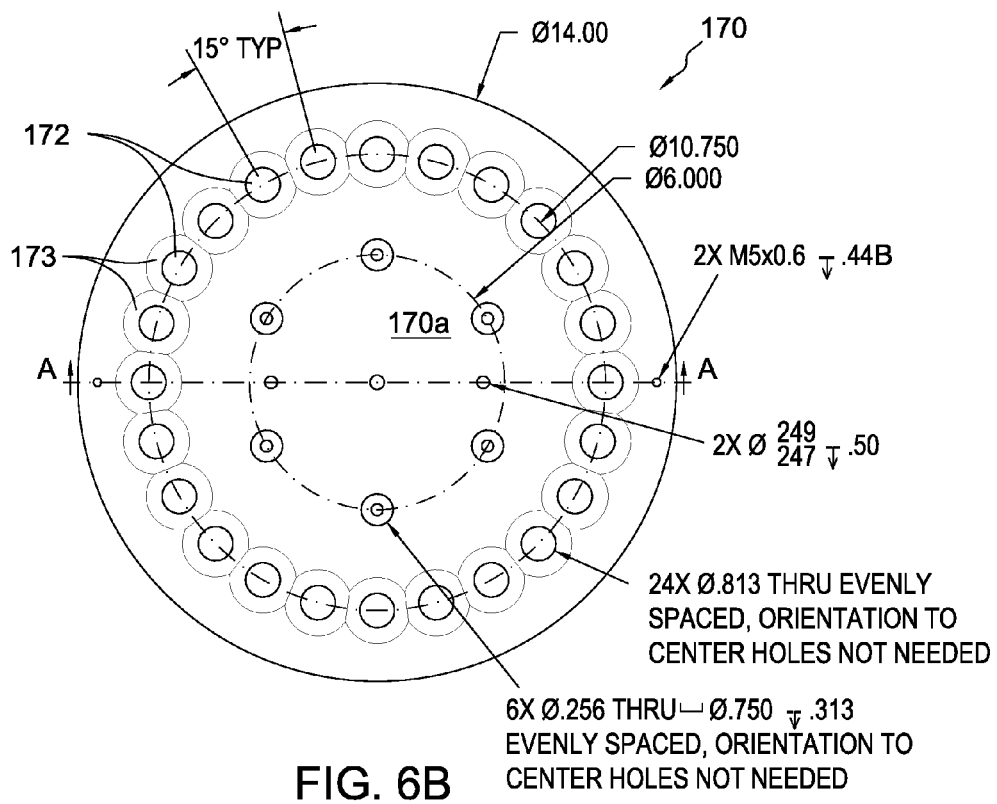
Figure 6C:
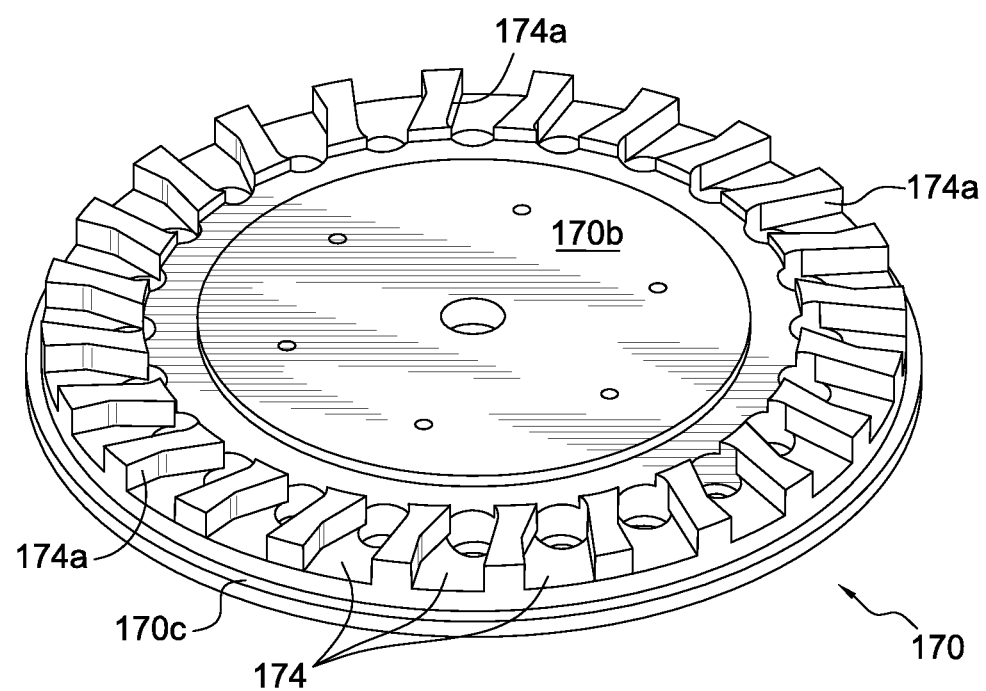
Figure 6D:
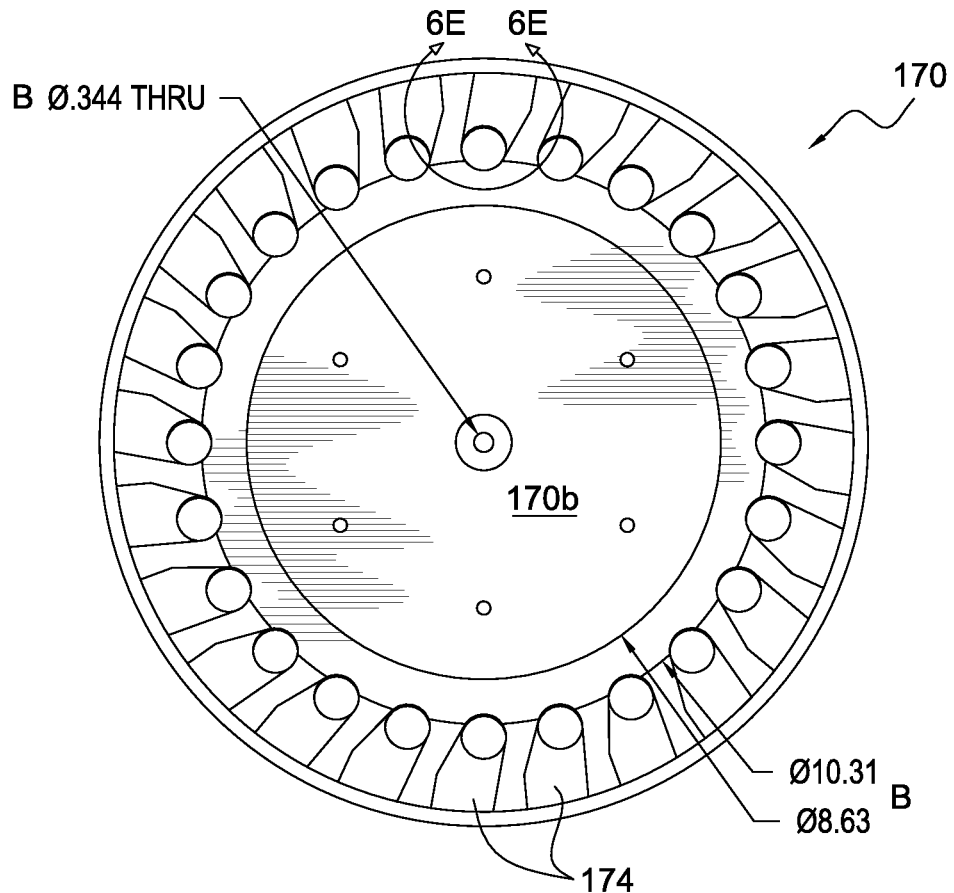
Figure 6E:
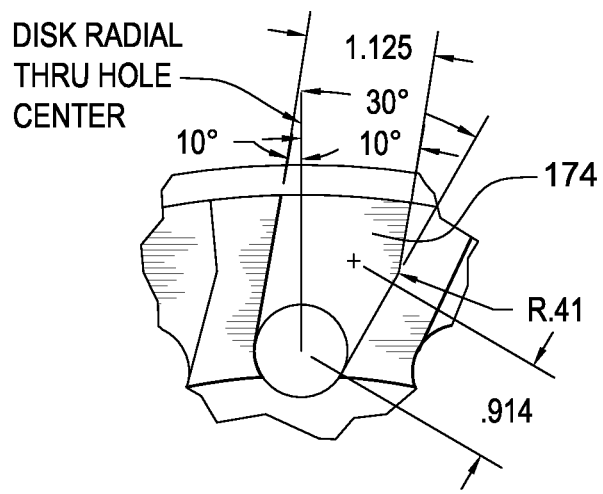

The feeder bowl assembly also includes a filter 170, which rotates in the bowl to move canisters in the tracks 126, 128. The filter is shown in more detail in FIGS. 6A-6E and 7. The filter 170 is generally disc-shaped, has a top surface 170a, a bottom surface 170b, and a circumferential edge 170c, and rotates about an axis. A plurality of circumferentially-arranged holes 172 are formed through the top surface 170a of the filter 170. A radius 173 is provided on each of the holes. Slots 174, shown best in FIG. 6E, are formed in the bottom surface 170b and extend radially outwardly from the holes 172 to the filter's circumferential edge 170c. Sides 174a of the slots 174 are angled relative to the radius of the filter 170.

Figure 7:
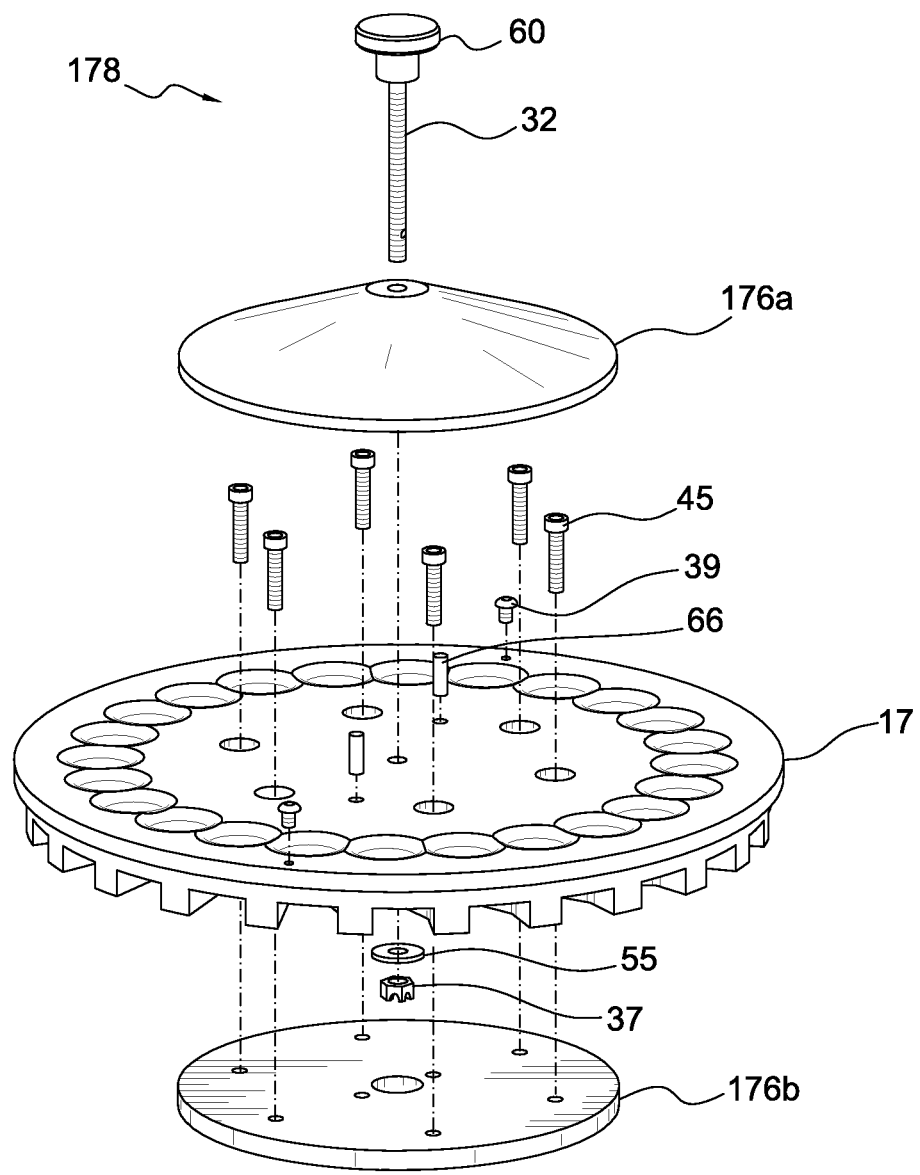
FIG. 7 is a perspective view another portion of the feeder bowl assembly of FIG. 2.

The filter 170 is mounted for rotation in the bowl 110. To this end, as illustrated in FIG. 7, top and bottom hubs 176a, 176b are fixed to the filter 170. In the illustrated embodiment, a thumb screw 178 is provided to fix these members together, relative to a shaft of an actuator, which will be described in more detail below. The top hub 176a preferably has a sloped top, and as such is cone-shaped to guide canisters away from the axis and toward the holes.

The holes 172 are sized to allow a single canister, oriented with its axis vertical, to enter and pass therethrough. The radii 173 around the holes 172 promote entry of the canisters into the hole in this orientation. The holes 173 are spaced radially from the axis such that they align with the inner track 126 of the bowl 110. Thus, as a canister enters a hole 173, the canisters bottom is captured in the inner track while the top of the canister is still in the hole 173. The inside surface of the hole will thus push the canister along the inner track as the filter rotates. When the canister reaches the inner track termination 126b, the canister's bottom is no longer constrained by the track. The canister contacts the diverter 134, which forces the canister radially outward. The slot is sufficiently deep relative to the bottom surface 170b that it does not impede radially outward movement of the canister in the slot 174. The sides 174a of the slots will constrain movement of the canister. Continued rotation of the filter will guide the canister into the outer track 128. After another rotation, that canister will exit the assembly, as described above.

The filter 170 may be disposed to rotate on the base of the feeder bowl 110 or may be spaced therefrom. A portion of the filter 170 may be disposed in the central cutout 125.

As best illustrated in FIG. 2, the base 190 of the system preferably has a substantially flat mounting plate 192 upon which the bowl 110 is disposed. An actuator 194 also is provided, having a shaft 196 for receiving the thumb screw 178 to fix the filter 170. In the illustrated embodiment, the actuator 194 is fixed to the bottom of the flat mounting plate 192, with the shaft 196 extending through the base plate 192. Appropriate bearing, spacers and the like, may also be provided, as will be appreciated by those having ordinary skill in the art.

While the invention has been described in connection with several presently preferred embodiments thereof, those skilled in the art will appreciate that many modifications and changes may be made therein without departing from the true spirit and scope of the invention which accordingly is intended to be defined solely by the appended claims.

The invention claimed is:

1. An apparatus for dispensing an article into a container, comprising:
   a first rotatable member disposed proximate an outlet of a supply providing, seriatim, a plurality of articles, the first rotatable member being disposed to rotate about a rotation axis and having a plurality of first article receptacles formed as holes through the first rotatable member and sized to receive an article, the plurality of first article receptacles being spaced circumferentially about the rotation axis and positionable to selectively receive one of the plurality of articles from the outlet;
   a second rotatable member connected to the first rotatable member to rotate therewith about the rotation axis, the second rotatable member having a plurality of second article receptacles formed as holes through the second rotatable member and spaced circumferentially about the rotation axis, each of the second article receptacles being aligned with one of the first article receptacles along an axis parallel to the rotation axis;
   a first plate between the first rotatable member and the second rotatable member, the first plate being disposed proximate a side of the first rotatable member opposite the outlet, extending along a direction of rotation of the first rotatable member, and terminating at a first ledge, wherein each article, upon entering one of the first article receptacles, sits on the first plate with continued rotation of the first rotatable member relative to the first plate causing the article to slide along the first plate until the article reaches the first ledge, at which time the article leaves the first article receptacle; and
   a second plate proximate a side of the second rotatable member opposite the first plate, the second plate being disposed opposite the first ledge, extending in the direction of rotation of the second rotatable member and terminating at a second ledge, wherein each article leaving the first article receptacle at the first ledge enters one of the second article receptacles and sits on the second plate, continued rotation of the second rotatable member causing the article to slide along the second plate until the article reaches the second ledge, at which time the article leaves the second article receptacle.

2. The apparatus of claim 1, wherein the first and second rotatable members are fixed relative to each other.

3. The apparatus of claim 1, further comprising a sensor arranged proximate the second ledge.

4. The apparatus of claim 3, wherein the sensor senses canisters leaving the second article receptacles.

5. The apparatus of claim 1 further comprising an alignment sensor disposed to sense an alignment of at least one of the first and second rotatable members.

6. The apparatus of claim 1, further comprising a drive system arranged to rotate at least one of the first and second rotatable members.

7. The apparatus of claim 1, further comprising an article supply.

8. The apparatus of claim 6, the article supply comprising a conduit.

9. The apparatus of claim 7, further comprising an adapter disposed on a distal end of the conduit, the apparatus being configured for selective removal from a position aligning the conduit with the first rotatable member.

10. The apparatus of claim 8, further comprising at least one sensor disposed to sense presence of an article in the conduit.

11. The apparatus of claim 1, wherein at least one of the first plate and the second plate are movable relative to the first and second rotatable member.

12. The apparatus of claim 1, wherein the article is a sorbent canister.

* * * * *